US011111078B2

(12) United States Patent
Laible

(10) Patent No.: US 11,111,078 B2
(45) Date of Patent: Sep. 7, 2021

(54) MANUALLY OR ROBOTICALLY OPERABLE LOAD CARRIERS WITH AT LEAST ONE STACKING COLUMN FOR STORING STORED MATERIAL

(71) Applicant: MTS Maschinenbau GmbH, Mengen (DE)

(72) Inventor: Eckhard Laible, Leinfelden Schlechtenmühle (DE)

(73) Assignee: MTS Maschinenbau GmbH, Mengen (DE)

( * ) Notice: Subject to any disclaimer, the term of this patent is extended or adjusted under 35 U.S.C. 154(b) by 23 days.

(21) Appl. No.: 16/559,964

(22) Filed: Sep. 4, 2019

(65) Prior Publication Data

US 2021/0061570 A1 Mar. 4, 2021

(51) Int. Cl.
*B65G 1/14* (2006.01)
*F16B 2/10* (2006.01)

(52) U.S. Cl.
CPC . *B65G 1/14* (2013.01); *F16B 2/10* (2013.01)

(58) Field of Classification Search
CPC ................................... B65G 1/14; F16B 2/10
See application file for complete search history.

(56) References Cited

U.S. PATENT DOCUMENTS

| 3,384,266 | A | * | 5/1968 | Schuller | B65G 1/14 221/90 |
| 4,572,382 | A | * | 2/1986 | Niederprum | B65G 1/14 108/134 |
| 4,712,691 | A | * | 12/1987 | Grill | B65G 1/14 211/150 |
| 5,938,051 | A | * | 8/1999 | Scholler | B65G 1/14 211/150 |
| 5,988,777 | A | * | 11/1999 | Schoeller | B65G 1/14 211/41.1 |
| 6,223,911 | B1 | * | 5/2001 | Weaver | A47B 47/027 211/150 |
| 7,210,892 | B2 | * | 5/2007 | Strobel | B65G 1/14 211/150 |
| 7,347,654 | B2 | * | 3/2008 | Mondejar Jimenez | B65G 1/14 410/32 |
| 7,878,343 | B2 | * | 2/2011 | Strobel | B65G 1/14 211/150 |
| 9,022,371 | B2 | * | 5/2015 | Seghezzi | B65G 1/14 269/55 |

(Continued)

FOREIGN PATENT DOCUMENTS

| DE | 3536251 C1 * | 12/1986 | ............... B65G 1/14 |
| DE | 3807663 A1 * | 9/1989 | ............... B65G 1/14 |

(Continued)

*Primary Examiner* — Stanton L Krycinski
(74) *Attorney, Agent, or Firm* — Fishman Stewart PLLC

(57) ABSTRACT

A manually or robotically operable load carrier with at least one stacking column for storing material on top of or next to each other on ratchet elements, which are at least partially associated with a clamping ratchet element is disclosed. Embodiments include a first ratchet element connected by way of a strip to a second ratchet element arranged above or next to the first ratchet element. With embodiments, the clamping ratchet element is connected, firstly, to the first ratchet element, by way of a short strip, and secondly, to the second ratchet element, by way of a long strip.

21 Claims, 6 Drawing Sheets

(56) References Cited

U.S. PATENT DOCUMENTS

| | | | | |
|---|---|---|---|---|
| 10,280,002 B2 * | 5/2019 | Giachero | ............... | B65G 1/14 |
| 10,829,318 B2 * | 11/2020 | Kreft | ............... | A47F 7/0042 |
| 2007/0152544 A1 * | 7/2007 | Strobel | ............... | B65G 1/14 |
| | | | | 312/9.58 |

FOREIGN PATENT DOCUMENTS

| | | | | | |
|---|---|---|---|---|---|
| DE | 3808338 A1 * | 9/1989 | ............... | B65G 1/14 |
| DE | 4113724 A1 * | 10/1992 | ............... | B65G 1/14 |
| DE | 4124045 A1 * | 1/1993 | ............... | B65G 1/14 |
| DE | 9318410 U1 * | 2/1994 | ............... | B65G 1/14 |
| DE | 29708323 U1 * | 10/1997 | ............... | B65G 1/14 |
| DE | 19617518 A1 * | 11/1997 | ............... | B65D 19/44 |
| DE | 19641270 A1 * | 4/1998 | ............... | B65G 1/14 |
| DE | 19729442 A1 * | 1/1999 | ............... | B65G 1/14 |
| DE | 19831181 C1 * | 3/2000 | ............... | B65G 1/14 |
| DE | 10000371 A1 * | 11/2000 | ............... | B65G 1/14 |
| DE | 10042682 A1 * | 3/2002 | ............... | B65G 1/14 |
| DE | 10142211 A1 * | 3/2003 | ............... | B65G 1/14 |
| DE | 10249629 A1 * | 5/2004 | ............... | B65G 1/14 |
| DE | 10300583 A1 * | 7/2004 | ............... | B65G 1/14 |
| DE | 10320566 B3 * | 12/2004 | ............... | B65G 1/14 |
| DE | 102005025813 A1 * | 12/2006 | ............... | B65G 1/14 |
| DE | 102009032680 A1 * | 1/2011 | ............... | B65G 1/14 |
| DE | 102009046063 A1 * | 5/2011 | ............... | B65G 1/14 |
| DE | 202013100674 U1 * | 4/2013 | ............... | B65G 1/14 |
| DE | 202016000929 U1 * | 2/2016 | ............... | B65G 1/14 |
| DE | 102016106587 A1 * | 10/2017 | ............... | B65G 1/14 |
| EP | 0192613 A2 * | 8/1986 | ............... | B65G 1/14 |
| EP | 0613837 A1 * | 9/1994 | ............... | B65G 1/14 |
| EP | 0854100 B1 | 3/2001 | | |
| EP | 0890531 B1 | 10/2001 | | |
| EP | 1340697 A1 * | 9/2003 | ............... | B65G 1/14 |
| EP | 2022733 A1 * | 2/2009 | ............... | B65G 1/14 |
| EP | 2305580 A2 * | 4/2011 | ............... | B65G 1/14 |
| FR | 2631004 A1 * | 11/1989 | ............... | B65G 1/14 |
| FR | 2851553 A1 * | 8/2004 | ............... | B65G 1/14 |
| FR | 2968290 A1 * | 6/2012 | ............... | B65G 1/07 |
| JP | 2001341821 A * | 12/2001 | ............... | B65G 1/14 |
| WO | WO-2006131300 A1 * | 12/2006 | ............... | B65G 1/14 |
| WO | WO-2007118634 A1 * | 10/2007 | ............... | B65G 1/14 |
| WO | WO-2007137832 A1 * | 12/2007 | ............... | B65G 1/14 |
| WO | WO-2008122307 A1 * | 10/2008 | ............... | B65G 1/14 |
| WO | WO-2009021725 A1 * | 2/2009 | ............... | B65G 1/14 |
| WO | WO-2009156116 A1 * | 12/2009 | ............... | B65G 1/14 |

* cited by examiner

MANUALLY OR ROBOTICALLY OPERABLE LOAD CARRIERS WITH AT LEAST ONE STACKING COLUMN FOR STORING STORED MATERIAL

TECHNICAL FIELD

The disclosure relates to a manually or robotically operable load carrier with at least one stacking column for storing storage material on top of or next to each other on ratchet elements, including load carriers which are at least partially associated with a clamping ratchet element, wherein a first ratchet element is connected by way of a strip having a second ratchet element arranged above or next to the first ratchet element.

BACKGROUND

Stacking columns of this type are best known in the automotive industry and in the market. However, the disclosure should not be limited thereto. In all of these stacking columns, the stored material rests in or on the ratchet elements, whether it is a standing or a lying stacking column, with the risk that the stored material will be moved. In particular, when the stacking columns are designed to be transportable, this disadvantage has a considerably unfavorable effect. Movement on the support arms/ratchet elements can also damage the stored material. Therefore, it may be necessary that the stored material is also additionally secured in the stacking columns. So far, all sorts of complicated clamps and other brackets are used, which mean significant additional work.

From EP 0 854 100 B1, for example, a stacking column for storing stored material, in particular car body parts, on support arms of ratchet levers is known. In this case, the ratchet lever rotates about a rotation axis from a rest position to a working position, wherein a plurality of ratchet levers are arranged one above the other or side by side and are in operative connection. There it is proposed that between two adjacent ratchet levers an intermediate ratchet element is provided, which after a placement of the stored material on or against the one ratchet lever, can be placed on or against the stored material by the pivot movement of the other ratchet lever, otherwise of the one ratchet lever.

EP 0 890 531 B1 describes a similar ratchet element to which a clamping ratchet element is assigned. These ratchet elements have proven themselves in practice and find a variety of applications.

SUMMARY

With embodiments, an object of the present disclosure is to provide by the clamping of the components a stacking column of the type mentioned above, which allows damage-free transport with significantly increased packing density. On the other hand, the stacking column may consist of the smallest possible number of items, and may be easy to assemble and easy to use. At the same time, it should be possible to accommodate different spacing distances by adapting only a few parts.

With embodiments, an object of the present disclosure is to provide a stacking column of the aforementioned type, which consists of the smallest possible number of items, and is easy to assemble and easy to use. At the same time, it should be possible to accommodate different spacing distances by adapting only a few parts.

To facilitate the foregoing, the clamping ratchet element may be connected on the one hand via a short strip with the first ratchet element and on the other hand via a long strip with the second ratchet element.

Basically, the stacking column may be used as a vertical stacking column with stacked ratchet element arrangements arranged one above the other or as a stacking column with ratchet element arrangements arranged side-by-side. An inclined stacking column is also possible. The present disclosure includes a load carrier, as well as a single stacking column. In general, a plurality of stacking columns may be arranged on a corresponding frame or corresponding load carrier or transport carriage. The frame with this kind of stacking columns may be operated manually or automatically (e.g., to be loaded or unloaded with robots).

The interaction of short strips and long strips can provide the advantage that the spacing distance can be determined by the choice of the length of the long strip, which connects the two successive ratchet element arrangements together. At the same time, through the movement of the preceding ratchet element, a lifting movement may be made from a standby position to a working position of the long strips so far that the subsequent ratchet element can bring the clamping ratchet element of the previous ratchet element arrangement in the locked position, wherein a dead center between a common linkage of short strips and long strips on a stub shaft, which protrudes from the clamping ratchet element, may be overcome. To help ensure this, the stub shaft may pass through a slot in both the short strip and the long strip.

Furthermore, for some embodiments, a region of the long strip, possibly also a region of the short strip, may be designed to be elbowed, which can facilitate overcoming the dead center.

In embodiments, a short strip may be connected at the other end with a cross pin of a ratchet element, in which case the cross pin may pass through a slot in the short strip. Both slots of the short strip may be coordinated so that they allow, in case of rotation of the ratchet element in the working position, for the direct entrainment of the clamping ratchet element in a provision, but then after rotation of the subsequent ratchet element, they allow a rotation of the clamping ratchet element against the previous ratchet element and thus the generation of a locking position of the first clamping ratchet element.

The long strip may, however, have a simple normal articulated connection with the subsequent clamping ratchet element without slot.

Opposite the arrangement of short strips and long strips, a strip is provided, which, except for the first ratchet element arrangement, may be equipped on both sides with one slot each. This can allow entrainment of the following ratchet element from a rest position to a standby position and then a movement of the ratchet element into a working position under the load of the load.

The movement of the ratchet element may be limited by the arrangement of a curved slot in a side wall, in which slot a cross pin engages, on which also the above-mentioned strip and the above-mentioned short strip are each arranged laterally at the side of the ratchet element.

By the present disclosure, it is particularly possible that components with undercuts, such as car side walls, may be nested damage-free in this way, from which up to a packing density higher by 50 percent or more can be achieved on the same area. Above all, the possible higher packing density with simultaneous damage-free transport and automatic operation of the racks must be emphasized.

According to the disclosure, the last ratchet element arrangement may also be associated with a locking device. This may involve a simple lever, which may be rotationally connected to the uppermost clamping ratchet element, i.e. with the lever, the uppermost clamping ratchet element can be moved to its working position. With embodiments of the disclosure, such an uppermost clamping ratchet element may be fixed by a lock. For the sake of simplicity and preference, with some embodiments this lock can be produced by integrally forming at least one extension on the uppermost clamping ratchet element which, upon rotation of the clamping ratchet element, strikes a pinch roller which is spring-loaded and which can be pivoted out with the aid of the clamping ratchet element, so that after passing over a dead center of the extension, this pinch roller can fall under the force of a spring in the closed position.

For unlocking, an angle lever may be provided, and with embodiments the angle lever may be actuated, for example, by a corresponding robot. Such an angle lever can be moved against the force of a spring along a side wall, for which at least two slots may be provided in the angle lever, which are penetrated by screw bolts on the side wall.

The angle lever may further have a lower gate, which may cooperate with the above-mentioned pinch roller. This gate may include a pitch that is rolled over by the pinch roller so that the pinch roller makes a pivotal movement, which in turn can release the extension on the clamping ratchet element. Thus, the ratchet element arrangements can fall back to their original position.

Of course, instead of the angle lever, another device, such as a pushbutton or slider, can be applied which may effectively perform the same or similar function. Many possibilities are conceivable here and should be covered by the present disclosure.

Moreover, the selected lock according to the disclosure may be used in any mounting position of the stacking column in the load carrier. This applies to a vertical, horizontal or diagonal arrangement.

BRIEF DESCRIPTION OF THE DRAWINGS

Further advantages, features and details of the disclosure will become apparent from the following description of preferred embodiments and from the drawings.

DETAILED DESCRIPTION

Figure 1:
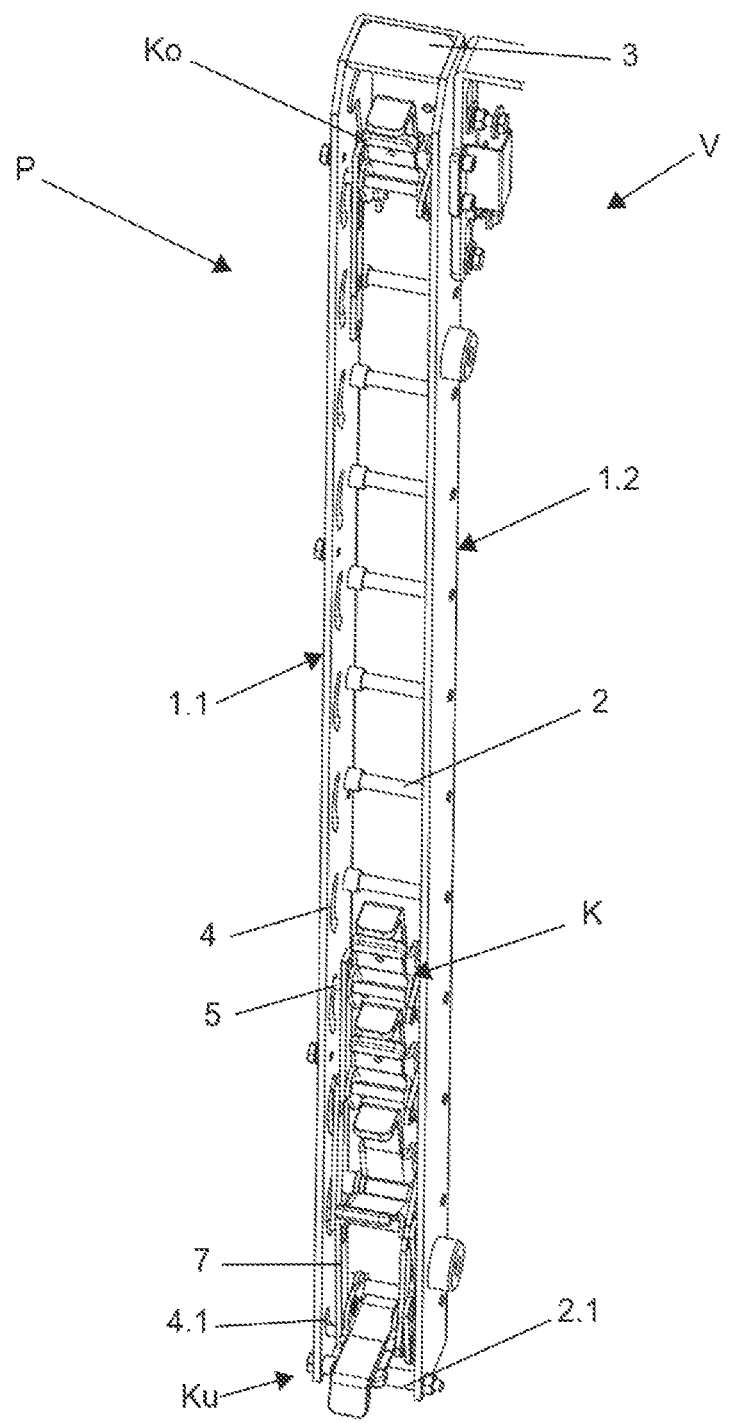
FIG. 1 shows a perspective front view of a stacking columimn according to an embodiment of the disclosure.
Figure 2:
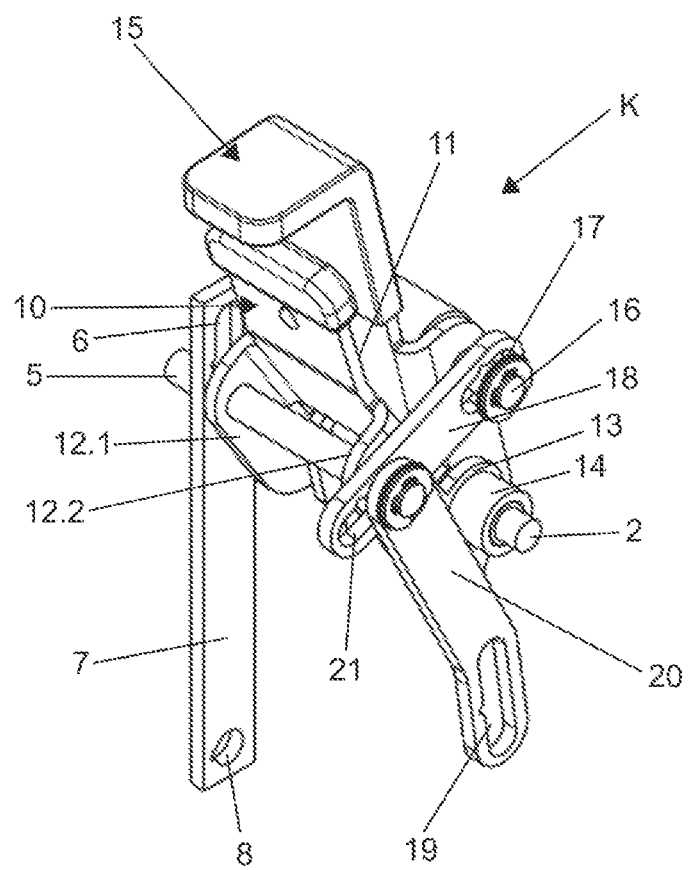
FIG. 2 is an enlarged perspective view of a ratchet element arrangement.

According to FIGS. 1 to 5, a stacking column P according to an embodiment of the disclosure may have two side walls 1.1 and 1.2, which may be connected to one another via a plurality of cross pins 2 and 2.1, respectively. A ratchet element arrangement K may be mounted at each cross pin 2 (not at the cross pin 2.1), such as generally shown in FIG. 2. The uppermost ratchet element arrangement Ko may also be part of a locking device V, such as described in connection with FIGS. 6 and 7. Furthermore, an end plate 3 may be provided between the two side walls 1.1 and 1.2 above the upper ratchet element arrangement Ko.

In the illustrated embodiment, the cross pins 2 are shown as individual, separate components. Of course, they could also be formed directly on the ratchet element assemblies K or project from them laterally and rotate in corresponding round holes in the side walls 1.1 and 1.2.

In the area of the ratchet element arrangements K approximately at the height of the cross pin 2, curved slots 4 may be formed in the side wall 1.1, in each of which a stop pin 5, which is part of the ratchet element arrangement K, may be guided.

As generally shown in FIG. 2, the stop pin 5 may pass through a slot 6 in a strip 7, wherein the strip 7 at the other end of the slot 6 may have an opening 8. When connecting with a subsequent ratchet element arrangement K, the stop pin 5 may pass through this opening 8 and, if it is a ratchet element arrangement between two other ratchet element arrangements, may pass through the stop pin 5 and a slot 6 of the strip 7 of a subsequent ratchet element arrangement.

Figure 3:
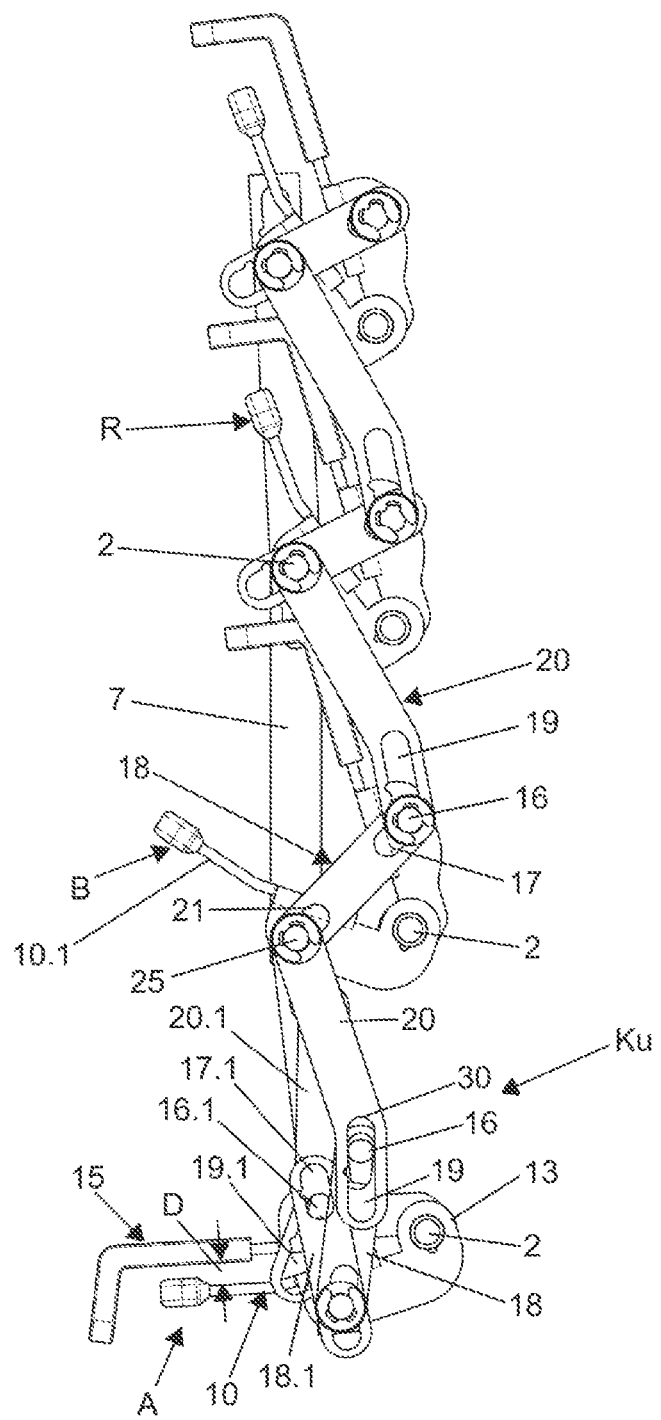
FIG. 3 is a side view of a plurality of superimposed and interconnected ratchet element arrangements.

The stop pin 5 may be arranged on a ratchet element 10, which may be intended to carry a stored product. This may be done on a support surface 11, which can move from a rest position R between the two side walls 1.1 and 1.2 into a standby position B and a working position A. These positions are generally illustrated in FIG. 3. In the movement from the rest position R by way of the standby position B into the working position A, the ratchet element 10 may entrain the stop pin 5, wherein the movement of the stop pin 5 may be limited by the curved slot 4 both in the rest position R and in the working position A. Moreover, the stop pin 5 may pass through two side wall strips 12.1 and 12.2, which may be bent away from the ratchet element 10.

Two mounting eyelets 13.1 and 13.2 (see, e.g., FIG. 5), through which the cross pin 2 leads from side wall 1.1 to side wall 1.2, may be formed at a rear end of the ratchet element 10 as a continuation of the side wall strips 12.1 and 12.2. A corresponding spacer sleeve is marked 14. This cross pin 2 may thus form a stationary element for the ratchet element 10, which may rotate about the cross pin 2.

Further, a clamping ratchet element 15 may be disposed on the cross pin 2, which in turn may have its own eyelets 31.1 and 31.2 (see, e.g., FIG. 5), which may pass through by the cross pin 2.

Figure 4:
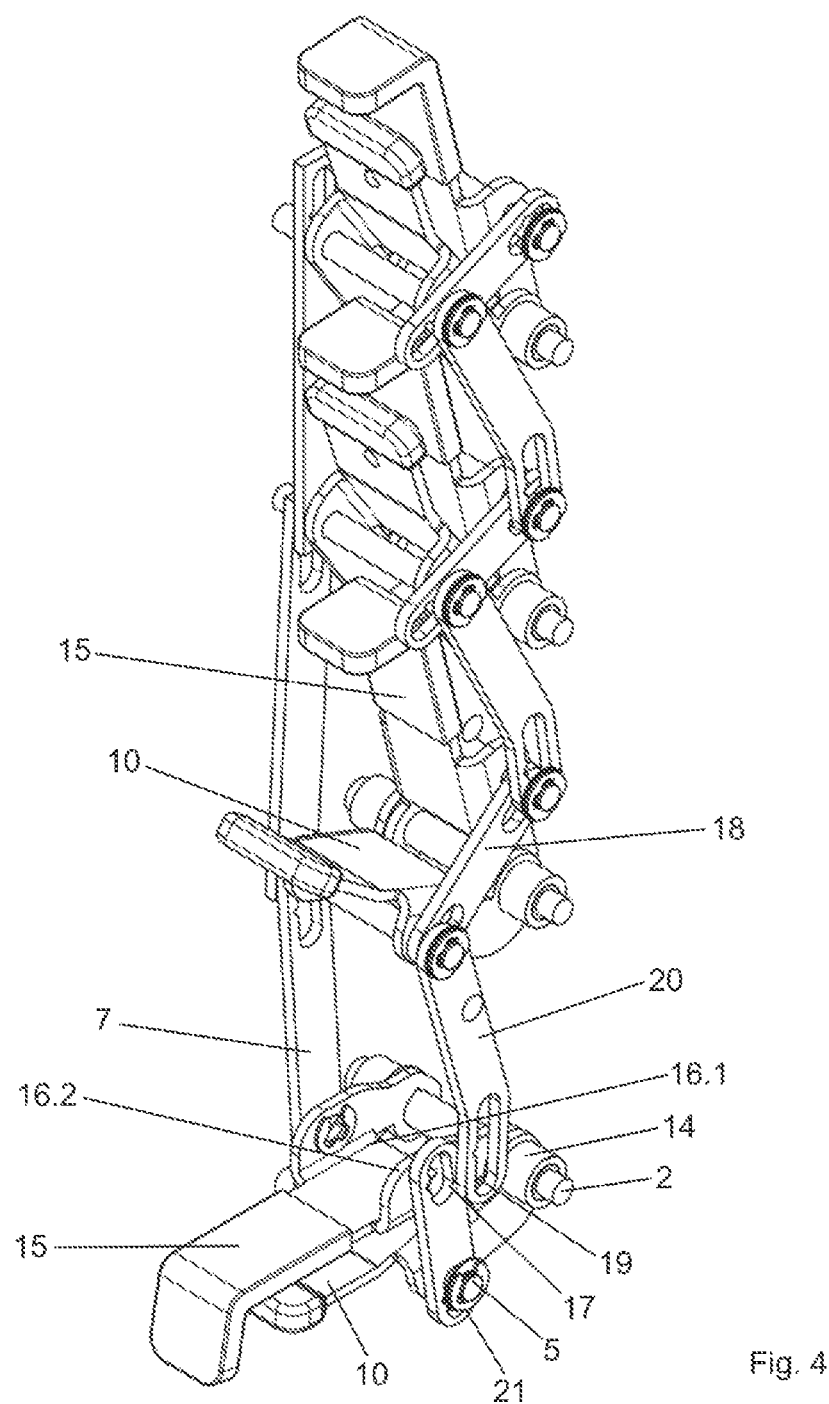
FIG. 4 shows a perspective view of the ratchet element arrangement according to FIG. 3.
Figure 5:
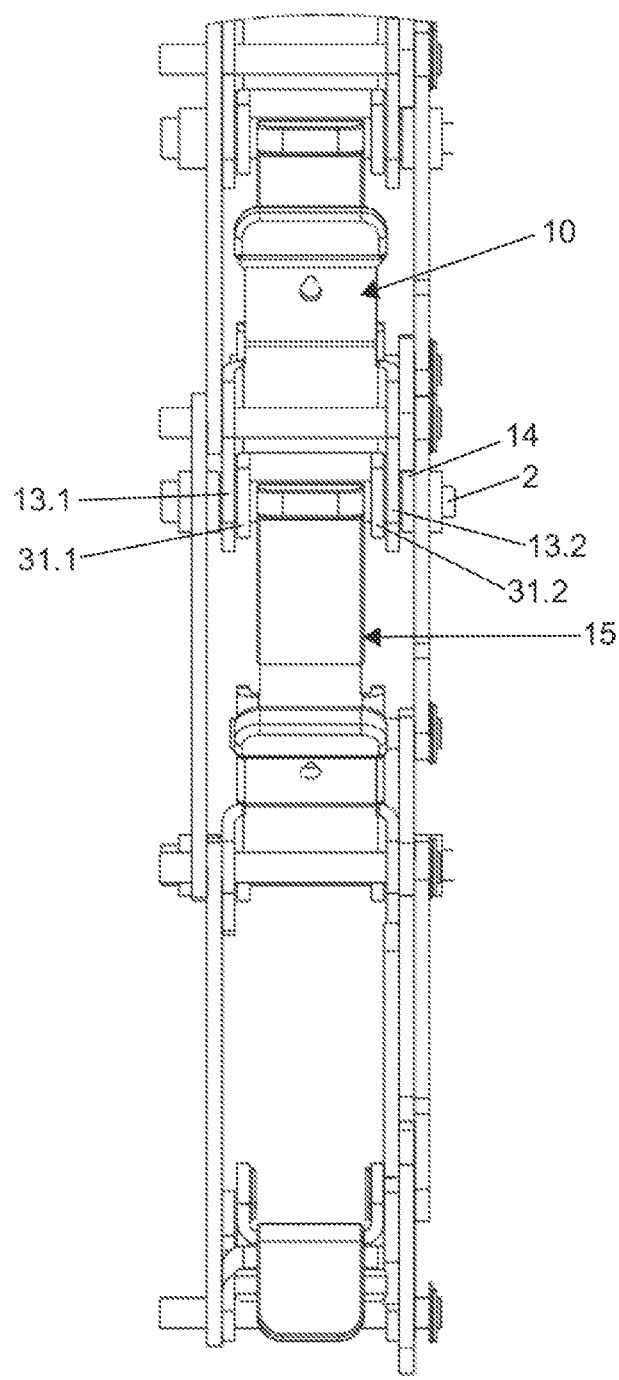
FIG. 5 shows a front view of the plurality of ratchet element arrangements according to FIGS. 3 and 4.

The bearing surface 11 of the ratchet element 10 may, as shown in particular in FIGS. 2 and 4, be slightly elbowed downward, while the area of the clamping ratchet element 15 cooperating with this bearing surface may extend approximately rectilinearly. This may create a distance D between the two ratchet elements, which may serve the entrapment of a load.

A stub shaft 16, which may pass through both a slot 17 in a short strip 18 and a slot 19 in a long strip 20, may project laterally from the clamping ratchet element 15. The long strip 20 may be elbowed, wherein the slot 19 may be in the bent area and may pass through by the stub shaft 16. At the other end, the long strip 20 may have an articulated connection without slot to the stop pin 5 of a subsequent ratchet element arrangement.

The short strip 18 may have an articulated connection to the stop pin 5 of its own ratchet element arrangement at the other end of the stub shaft 16 and may have a slot 21 there again.

The operation of an embodiment of the present disclosure may be as follows:

The ratchet element 10 of the lowest ratchet element arrangement Ku is, as shown in the figures, not in the standby position, which is why the corresponding curved slot 4.1 may be shorter in the side wall 1.1 in contrast to the other slots 4. Now, if this ratchet element 10 of this lowermost ratchet element arrangement Ku is loaded with a load, the ratchet element 10 may rotate about the cross pin 2 until the stop pin 5 is located at the other end of the curved slot 4.1, strikes there and the working position of the ratchet element 10 is thus reached.

In this movement of the ratchet element 10 about the cross pin 2, the stop pin 5 may entrain both the strip 7 and the short strip 18, so that both the clamping ratchet element 15 of its own ratchet element arrangement Ku and the ratchet element of the subsequent ratchet element arrangement K may be brought into the standby position. As such, the stop pin 5 of the subsequent ratchet element arrangement may abut, on the one hand, the end of the slot 6 of the strip 7, while it does not pass through a slot on the opposite side in the long strip 20, but has only an articulated connection to the long strip. This lack of another slot for a possibility of movement of the stop pin 5 may be replaced by a selected connection arrangement between the long strip 20 and short strip 18 and the stub shaft 16, for example, as explained in more detail below.

An interaction between long strips 20 and short strips 18 will be described in more detail with reference to FIG. 3, wherein in FIG. 3, the clamping ratchet element 15 of the first clamping ratchet element arrangement Ku is shown only in the working position, but not in the standby position. In contrast, the long strips are 20/20.1, the short strip 18/18.1 and the stub shaft 16/16.1 are shown with the associated slots once in the ready position and once in the working position. In the standby position, the long strip and the short strip are in the position marked 20 and 18, in the working position in the position marked 20.1 and 18.1.

When turning the ratchet element 10 about the cross pin 2, the short strip 18 may entrain the stub shaft 16 and thus also the clamping ratchet element 15, so that it is pivoted into the ready position.

Now, if the subsequent ratchet element 10.1 is loaded, this can get into a working position by the stop pin 5 moving along the slot 6 of the strip 7.

In contrast, the long strip 20 may put the stub shaft 16 under pressure, wherein the slot 19 runs backwards in the elbowed part of the long strip 20, so that the stub shaft 16.1 may abut against the rear end 30 of the slot 19. For further movement, as can be seen from the comparison of the two layers 20/18 and 20.1/18.1, a dead center must be overcome, which is made possible by the elbowed strip 20/20.1 and the angular position of the long strip 20 in relation to the short strip 18. The clamping ratchet element 15 may thus enter its working position, i.e. into its clamping or hold-down position for the load. At the same time, the stub shaft 16/16.1 may move in the slot 17/17.1 of the short strip 18. This may set the load.

If the subsequent ratchet element 10.1 is now loaded, the process may be repeated up to the top ratchet element Ko.

Figure 6:
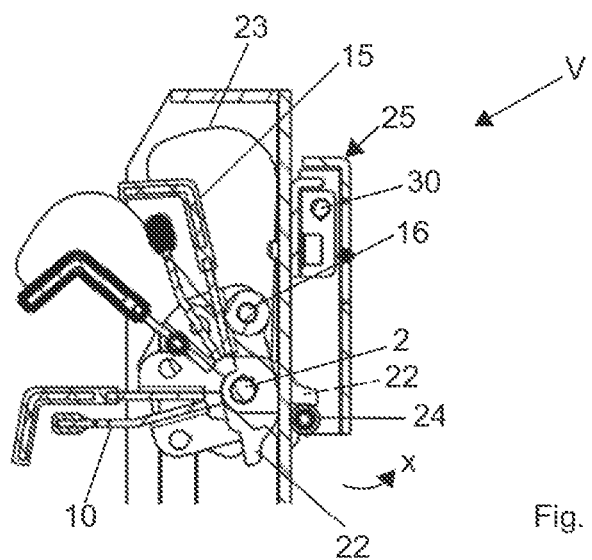
FIG. 6 shows a side view, broken away, of the stacking column according to FIG. 1 in the region of a locking device.

Once the last ratchet element 10 is loaded, the entire arrangement may be locked so that the stacking column arrangement can be transported without grossly or materially displacing the stored product. For this purpose, according to FIG. 6, the last clamping ratchet element 15 at the other end of the cross pin 2 may have an extension 22 formed thereon and a rotary lever 23 associated with it. This rotary lever 23 may also rotate about the cross pin 2 and may be connected to an extension of the shaft stub 16 so that it can bring the clamping ratchet element 15 in manual position upon manual operation. Here, the clamping ratchet element 15 may rotate about the cross pin 2, wherein the extension 22 may meet a pinch roller 24 which may sit in a housing 25. By the extension 22, the pinch roller 24 and with it the housing 25 may be pivoted outwards in the pivoting direction, so that, as shown in FIG. 6, the extension 22 can engage behind the pinch roller 24. The housing 25 itself may rotate about a shaft 26 and may be coupled to a torsion spring mounted on this shaft 26 so that it can be pivoted in the pivoting direction x.

Figure 7:
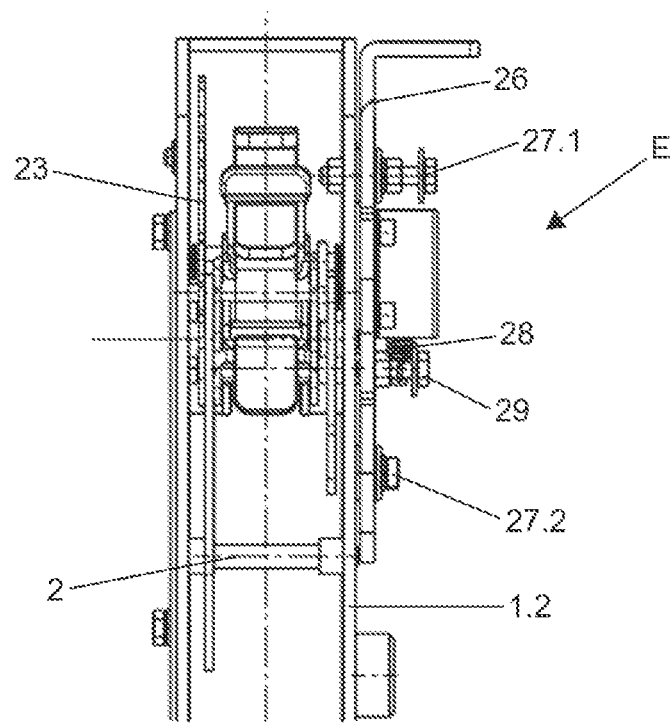
FIG. 7 shows a plan view of the locking device illustrated in FIG. 6.

An angle strip 26 and an arrangement as shown in FIG. 7 may serve for unlocking the locking device V. This angle strip 26 may be slidably disposed along the side wall 1.2, wherein two screw bolts 27.1 and 27.2 may pass through two slots (not shown in detail) in the angle strip 26. Further, a coil spring 28, of which only a part is indicated, may be arranged between the screw bolt 27.1 and another screw bolt 29, wherein the screw bolt 29 may be placed only on the angle strip 26, while the screw bolt 27.1 may be fixed to the side wall 1.2. Further, in the region of the pinch roller 24 the angle strip 26 may have a link (not shown), which may be passed by when moving the angle strip 26 from the pinch roller 24, so that the housing and together with it the pinch roller 24 may be moved about the shaft 30 in the pivoting direction x. As a result, the extension 22 may be released and the entire ratchet element arrangements may fall back to their original position.

The invention claimed is:

1. A stacking column for manually or robotically operable load carriers with at least one stacking column for storing stored material on top of or next to each other on ratchet elements that are at least partially associated with a clamping ratchet element, comprising:
    a first ratchet element connected by way of a strip to a second ratchet element arranged above or next to the first ratchet element, and
    a clamping ratchet element connected to the first ratchet element via a short strip and to the second ratchet element via a long strip;
    wherein the short strip and the long strip are arranged on a stub shaft which projects from the clamping ratchet element.

2. The stacking column according to claim 1, wherein the stub shaft projects laterally from the clamping ratchet element.

3. The stacking column according to claim 1, wherein the stub shaft passes through a slot in the short strip and/or a slot in the long strip.

4. The stacking column according to claim 1, wherein the long strip includes an elbowed area.

5. The stacking column according to claim 4, including a slot in the long strip in the elbowed area.

6. The stacking column according to claim 1, wherein the short strip has an articulated connection with the first ratchet element.

7. The stacking column according to claim 6, wherein the first ratchet element has a stop pin that engages a slot in the short strip.

8. The stacking column according to claim 1, wherein a stop pin of the second ratchet element engages a slot in the strip at an end of its connection with the first ratchet element.

9. The stacking column according to claim 1, wherein a connection with the clamping ratchet element is provided at an inner end of the first ratchet element.

10. The stacking column according to claim 9, wherein at the inner end of the first ratchet element a cross pin is provided, on which the clamping ratchet element is articulated.

11. The stacking column according to claim 1, wherein the first ratchet element and the clamping ratchet element rotate about the same cross pin, which is arranged on a side wall.

12. The stacking column according to claim 7, wherein the stop pin is guided at one end in a curved slot in at least one side wall.

13. The stacking column according to claim 1, wherein a last ratchet element is associated with a locking device.

14. The stacking column according to claim 13, wherein a last clamping ratchet element is associated with a rotary lever for pivoting the clamping ratchet element into clamping position, said clamping ratchet element with at least one rear extension configured to pass over a pinch roller.

15. The stacking column according to claim 14, wherein the pinch roller is spring-loaded.

16. The stacking column according to claim 13, wherein the locking device is associated with an unlocking device.

17. A stacking column for manually or robotically operable load carriers with at least one stacking column for storing stored material on top of or next to each other on ratchet elements that are at least partially associated with a clamping ratchet element, comprising:

a first ratchet element connected by way of a strip to a second ratchet element arranged above or next to the first ratchet element, and a clamping ratchet element connected to the first ratchet element via a short strip and to the second ratchet element via a long strip;

wherein a last ratchet element is associated with a locking device; wherein the locking device is associated with an unlocking device; and wherein the unlocking device has a link strip for pushing away a spring-loaded pinch roller.

18. The stacking column according to claim 17, wherein the link strip is movable against the force of an energy accumulator.

19. The stacking column according to claim 18, wherein the link strip is located on an angle strip which is movable along a side wall.

20. The stacking column according to claim 19, wherein the angle strip has two spaced slots, wherein at least one slot is engaged by a bolt fixed to the side wall.

21. The stacking column according to claim 20, wherein a further bolt rises from the angle strip, and the force accumulator is disposed between the two bolts.

\* \* \* \* \*